April 24, 1934.   A. L. BAUSMAN   1,956,306
APPARATUS FOR DECORATING CONFECTIONS
Filed Jan. 31, 1931    4 Sheets-Sheet 1
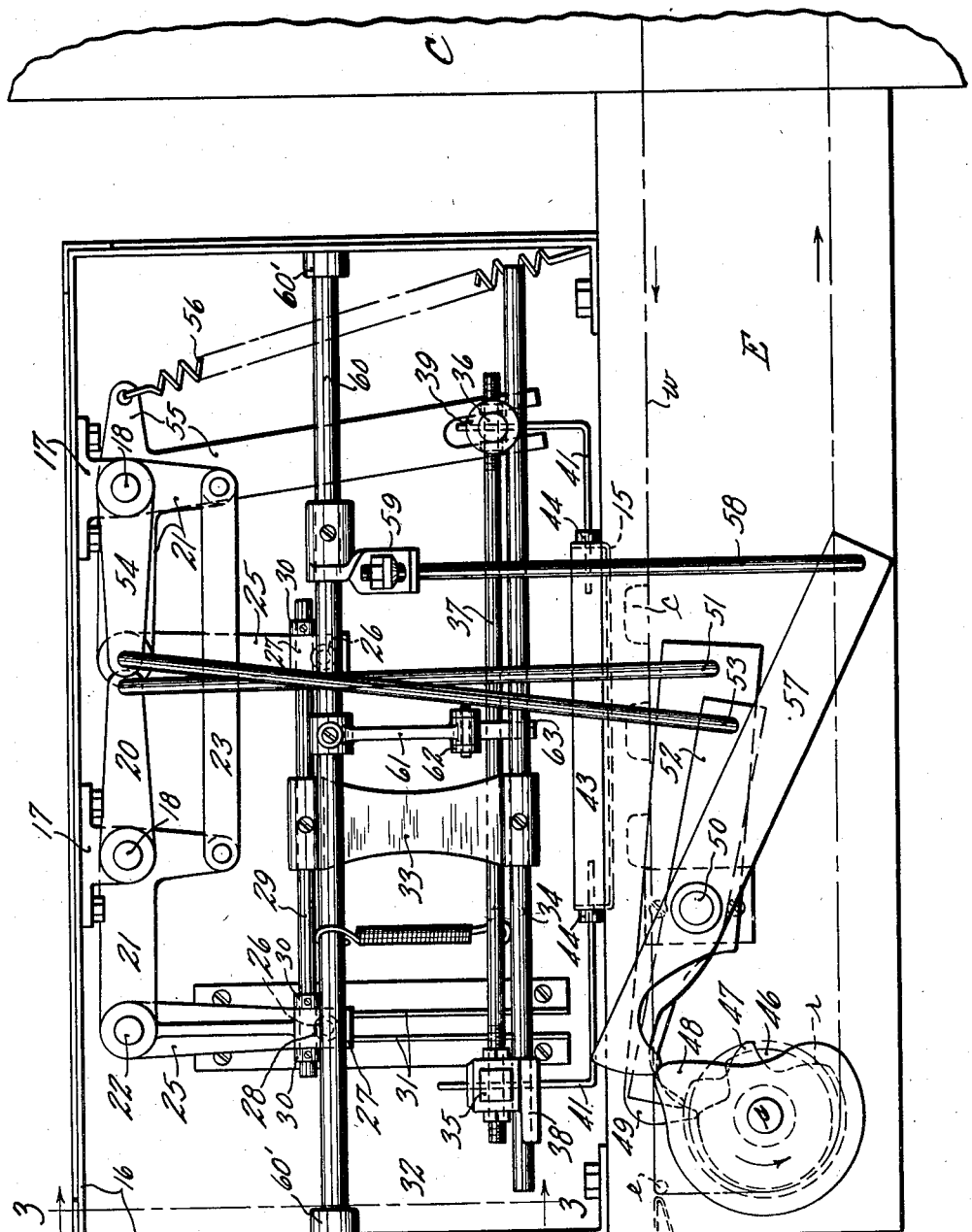
INVENTOR.
ALONZO LINTON BAUSMAN
BY Chapin & Neal
ATTORNEYS.

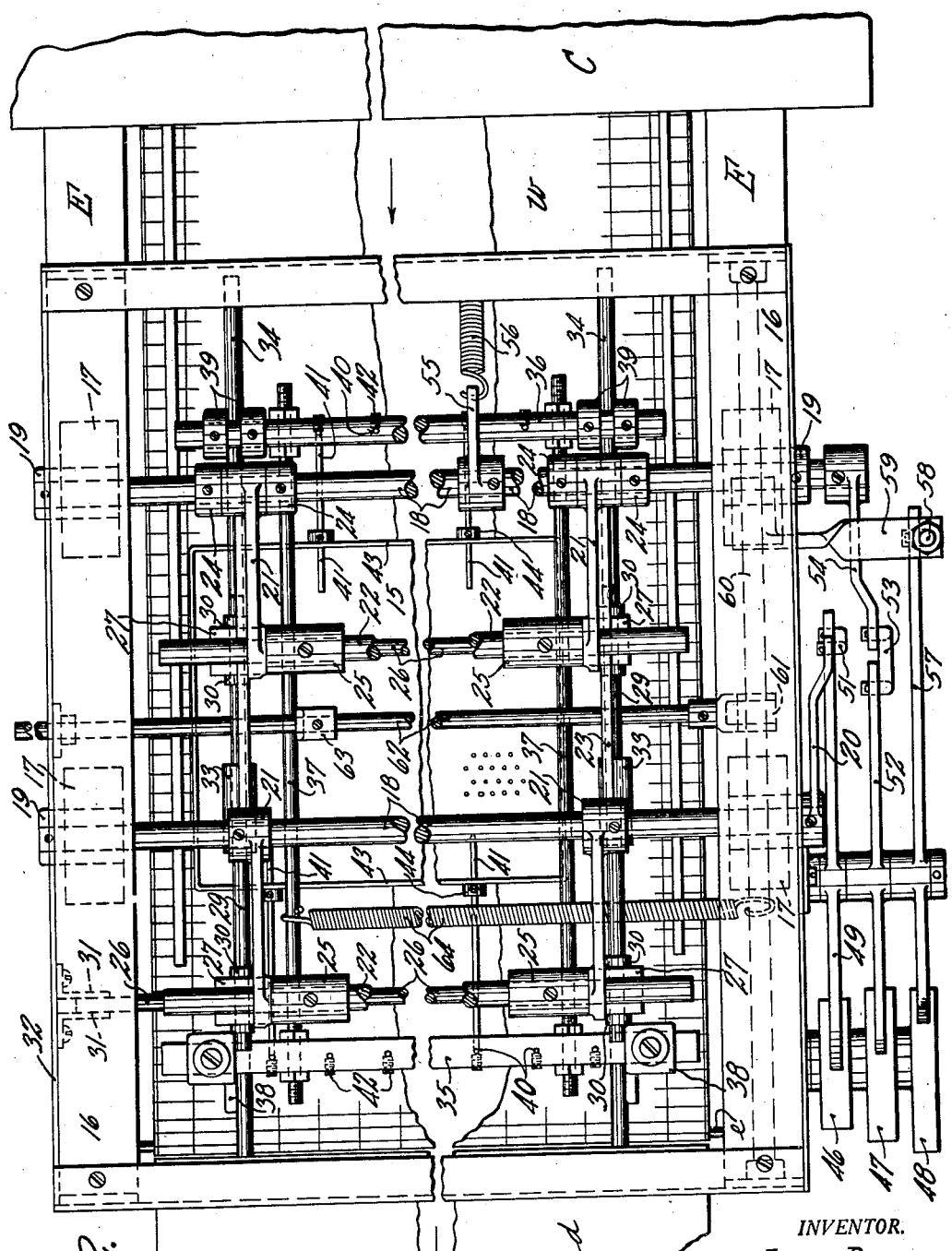

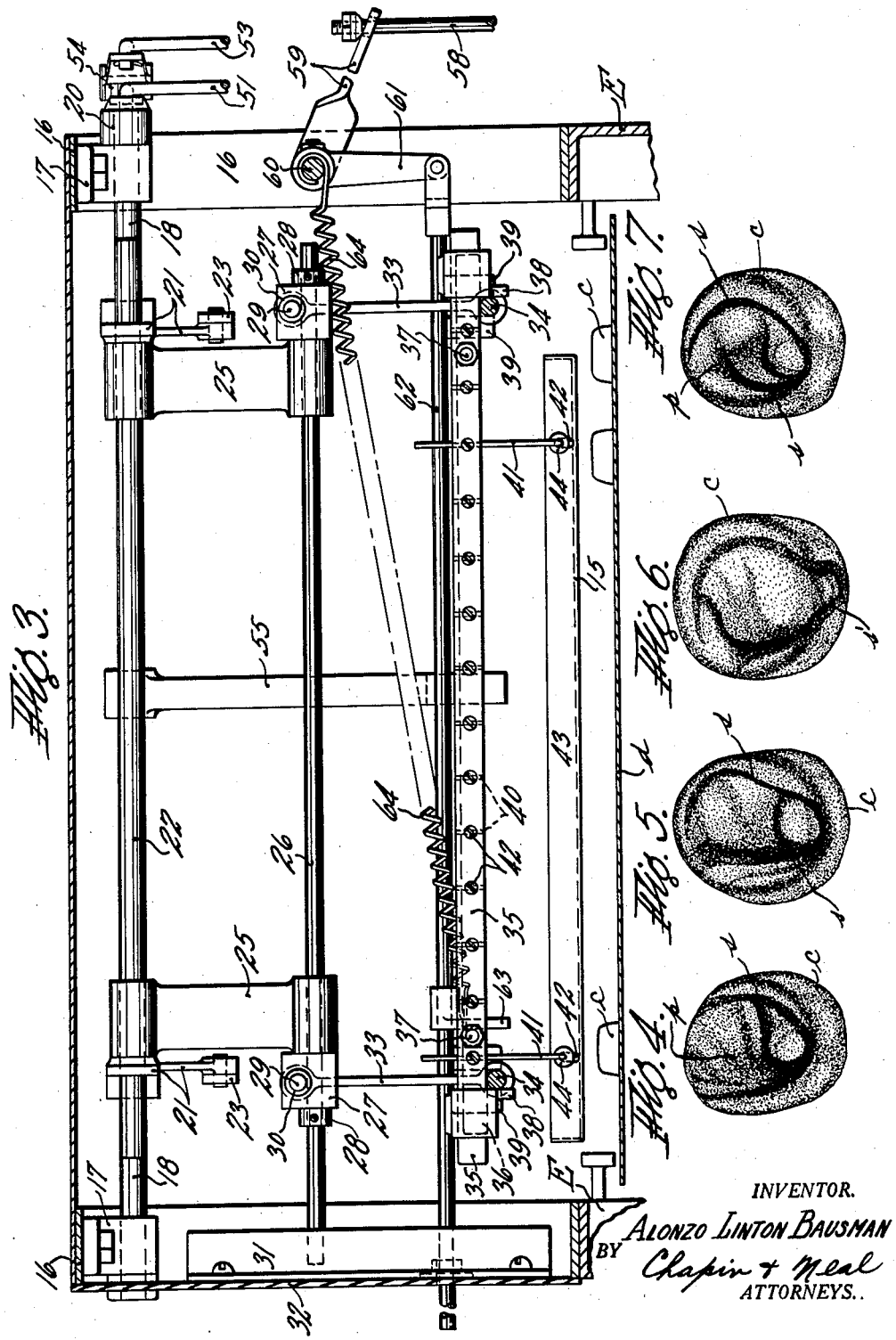

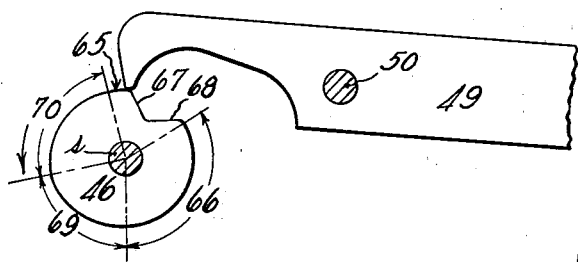
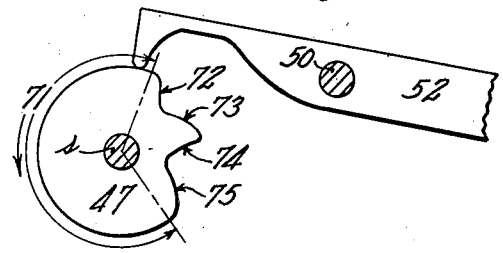
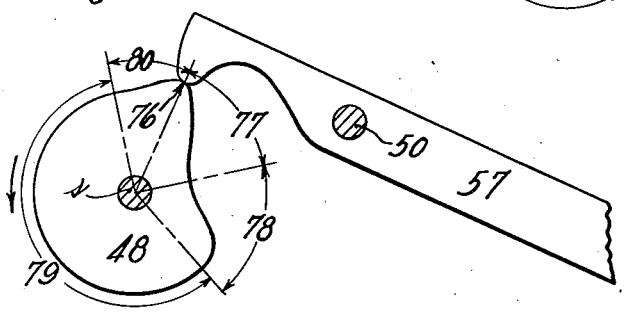
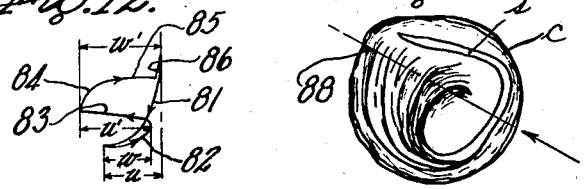
INVENTOR.
ALONZO LINTON BAUSMAN
BY Chapin + Neal
ATTORNEYS.

Patented Apr. 24, 1934

1,956,306

UNITED STATES PATENT OFFICE 1,956,306

APPARATUS FOR DECORATING CONFECTIONS

Alonzo Linton Bausman, Springfield, Mass., assignor to National Equipment Company, Springfield, Mass., a corporation of Massachusetts Application January 31, 1931, Serial No. 512,642

16 Claims. (Cl. 91—3)

This invention relates to an improved method and apparatus for decorating confections, such for example as confections freshly coated with chocolate, or any other confections, the outer surfaces of which are plastic and susceptible to being worked by the same treatment.

The invention is based upon the formation of the decoration by a working of the plastic covering of the confection. Such working of the coating has been effected heretofore in various ways. For example, use has been made of the so-called stroking tool which engages a confection at one side and near the base thereof and drags a portion of the coating up the side and over the top of the confection. There have also been rotating tools, which roll around the periphery of a confection and work the coating thereof into various decorative forms.

My invention is distinguished from these prior art examples in that a string is pulled out from the coating of the confection and then shaped and, after shaping, allowed to drop back on the confection. More particularly, the decorating tool moves into contact with the freshly coated confection to secure adhesion of a portion of the coating thereto and then moves a substantial distance away from the confection to draw out a portion of the coating into more or less string like form. While such drawn out string remains attached at one end to the confection and at the other end to the decorating tool, the tool is moved relatively to the confection to turn and bend the drawn out string into various ornamental forms, so that when the string breaks away from the decorating tool it will have been laid upon the confection, not in a purely haphazard manner, but in a manner which follows more or less closely, although not necessarily exactly, some predetermined plan. The strings, when laid back on the confections, merge with the coatings thereof and the decorations formed compare favorably with those produced by hand. In addition, the decorations are entirely lacking in any earmarks which would indicate their formation by machine.

The invention is also distinguished from those of the prior art in the feature that close alignment of the confections with the decorating tool is not required. The confections may be decorated while being carried forward continuously on a belt, and the particular position of a confection, either longitudinally or transversely on the belt does not matter. Care in feeding the confections to the belt of the coating machine to get them accurately alined in transverse rows, with uniform separation between the confections in each row as well as between the confections in one row and those in the next, is not required as it is with all former decorating apparatus of which I am aware.

Another feature of the invention is that one decorating tool can be used, if desired, to decorate a large number of confections simultaneously. All the confections which lie in one transverse row on the belt may be decorated simultaneously by one tool and, if desired, the one tool may readily be made to decorate at one time all the confections in several transverse rows. For the most part, so far as I am aware, it has been necessary where decorations are formed by the use of tools which contact with and work the coating, to use individual tools one for each longitudinal row of confections, and in every case so far as I am aware, it has been necessary to accurately aline the confections in longitudinal rows so as to insure that the confections in such rows will be properly engaged with their respective tools. In many cases also, it has been necessary to move the confections in a step by step manner while being decorated, as distinguished from continuously as is readily possible with this invention.

The invention marks a large step in advance not only in the improvement in the character and quality of the decorations but also in the simplification of the apparatus for producing them.

There are many other features contributing to the more important ones, above set forth, and these will more particularly appear as the detailed description proceeds and will be pointed out in the appended claims.

The invention will be disclosed with reference to the accompanying drawings, in which:

Fig. 1 is a side elevational view of an apparatus embodying the invention,—a side wall of the casing being removed to reveal interior mechanism;

Fig. 2 is a plan view thereof, shown with the top wall removed;

Fig. 3 is a fragmentary cross sectional view taken on the line 3—3 of Fig. 1;

Figs. 4, 5, 6 and 7 are plan views, showing coated confections decorated by the method and apparatus of this invention;

Figs. 8, 9 and 10 are elevational views of the cams for producing respectively, the vertical, longitudinal and lateral movements of the decorating tool;

Figs. 11 and 12 are diagrammatical views illustrative of the path of movement of the decorating tool;

Fig. 13 is a plan view of a coated confection decorated by the tool moving in the path shown in Fig. 12; and Fig. 14 is a cross sectional view showing a modification in the decorating member.

The decoration of confections, according to this invention, is accomplished by a working of the previously applied coating of the confection, while such coating is in plastic and workable condition, or in some possible cases, by a similar working of the outer surface of an uncoated confection, if sufficiently plastic. The usual condition is to work the freshly applied coating and usually, although not necessarily, such coating is chocolate,—a substance which while in fluid or semi-fluid condition, is quite viscous and readily adheres to any member which is brought into contact with it.

The method of this invention consists in moving a decorating member of any suitable type into contact with the fresh coating, which at once adheres thereto; in then moving the member away from the confection far enough to draw out a portion of the coating into a string; and in then moving the tool relatively to the confection to turn or bend the drawn-out string into various decorative configurations prior to the time when the string breaks away from the decorating member and falls back upon the confection. Since the string, thus drawn out, is attached at one end to the confection and at the other end to one point on the decorating tool, it follows that by moving the tool so that said point on the tool describes various paths relatively to the confection, the string may be ornamentally shaped. At the same time, the string will be still further drawn out and when it breaks away from the tool it will drop back upon the confection and merge with the coating thereof, forming a decoration.

Consider, for example, that the decorating member is simply a more or less flat plaque-like member, such as the flat piece of metal shown at 15 in Fig. 3, and that this horizontally disposed member is lowered until it engages with the top surface of a freshly coated confection, such as c, and is then raised, the result will be the drawing out of a string of coating. If now, this member 15 is moved in a horizontal plane relatively to confection c, the string thus drawn out may be turned, twisted, or otherwise shaped, and when the string breaks away from member 15 it will fall back upon the confection in some decorative form. Typical results of confections thus decorated are shown in Figs. 4 to 7. Consider Fig. 7 for example, the string s was drawn up from the confection, starting at the point p and the end of the string attached to the decorating tool 15 was so moved relatively to the confection that the string was laid thereon in the form of an approximately circular loop. After the string has been drawn out to the breaking point, it drops back upon the confection and merges with the coating thereof. The laying of the string on the confection is to some extent progressively accomplished. That is, it is or may be partly laid on the goods before the string breaks away from the decorating member.

The form of the decoration may of course, be varied by varying the path of movement of the decorating member and an almost endless variety of decorative figures may be formed by this method. The method is particularly suitable for decorating the tops or upper portions of confections and the illustrations, shown herein, are substantially flat topped confections, such as chocolate coated peppermints. The strings, although drawn from the top surface of the confections, do not need to be laid back entirely on such surface and may be made to fall on the side surfaces, as for example as indicated at s' in Fig. 6.

With this general understanding of the method of decoration, I will next proceed to describe an exemplary form of apparatus for practicing the method. This apparatus is shown in conjunction with a confection coating machine for decorating the freshly coated confections as they are delivered therefrom.

In the drawings, the coating machine is shown at C in fragmentary and conventional form. E represents the projecting frame forming the so-called extension portion of the machine and w the usual wire mesh belt. The delivery portion only of the wire belt w is shown together with its small end roll e and its driving roll r, fixed to a shaft s. The coating machine may be of any suitable form and an example of one suitable form will be found in my U. S. Letters Patent No. 1,323,948, granted December 2, 1919. The confections coated in machine C with chocolate or other coating, are carried on the upper stretch of belt w in the direction of the arrow shown in Fig. 1 and are delivered to the upper stretch of a delivery belt, shown in part and conventionally at d, which carries the candies to a cold room or through a cooling apparatus in the usual way.

The confections may be decorated while being carried by either of the belts d or w. The only essential is to perform the decorating operation while the coatings of the confections are plastic and workable. Usually, and as disclosed herein, the decorations are formed while the candies are being carried by belt w so that any drippings from the decorating member will fall through the pervious belt w and be returned to the supply tank of the coating machine in the usual way.

Upon each extension frame E, a suitable frame 16 is secured (Figs. 1 and 3). As herein shown, frame 16 is of substantially the shape of an inverted U. Fixed to the upper horizontal portion of each frame 16 in longitudinally spaced relation are a pair of brackets 17, which serve to support a pair of transversely disposed shafts 18. The latter are held against endwise displacement in any suitable way as in one case by two collars 19 (Fig. 2), fixed thereon one adjacent each bracket, and in the other case by a similar collar at one end and by the hub of a lever 20 at the other end. Each shaft 18 serves to support at longitudinally spaced points a pair of bellcranks 21 and the horizontal arms of each such pair serves to support a cross rod 22, which is free to turn in the aforesaid arms. The vertical arms of each bellcrank on the left hand shaft 18 are connected by links 23 to the corresponding arms of the bellcranks on the right hand shaft 18. The bellcranks on the left hand shaft are fixed thereto, while those on the right hand shaft can turn relatively thereto and are each held in place between a pair of collars 24 (Fig. 2). Movement of lever 20 will serve to simultaneously rock all four bellcranks 21.

Each cross rod 22 has fixed thereon a depending link 25 and these links coact with the horizontal arms of bellcranks 21 to hold rod 22 against endwise movement (Fig. 2). The lower ends of each pair of links 25 serve to support a cross rod 26, underlying rod 22. Mounted to turn on each rod 26 are a pair of rectangular blocks 27, arranged one adjacent each link 25 and held between the latter and a collar 28 on rod 26 against endwise movement. Each block 27 on one rod 26 is connected to the corresponding block on the other rod 26 by a horizontal and longitudinally disposed rod 29. Each block 27 is held between a pair of collars 30 on rod 29. One end of one rod 26 (Figs. 1 and 3) extends between a pair of angle irons 31, fixed to a rear wall 32 secured to the rear frame 16. Accordingly, this rod 26 is forced to move in a true vertical path as the bellcranks 21, which support it, are raised and lowered and the other rod 26, being tied to it by rods 29, will follow a similar path. The rods 29 will thus remain truly horizontal while they move up and down. These rods 29 support by means of links 33 a similar pair of rods 34,—the links being fixed to each as indicated.

The rods 34 serve to slidably support a frame which carries the decorating member or plaque 15. Such frame includes two cross rods 35 and 36, each of which extends across from one rod 34 to the other and which also rests upon and is slidably supported by rods 34. The rods 35 and 36 are interconnected by longitudinal tie rods 37 which complete the supporting frame for the decorator 15. Collars 38 on rod 35 engage rods 34, as shown in Fig. 3, to hold the frame against lateral displacement thereon and yet allow free longitudinal sliding movement on rods 34. Rod 36 carries pairs of collars 39 between each of which a rod 34 is slidably engaged for a similar purpose. Each rod 35 and 36 has a plurality of vertical holes 40 therethrough to receive the vertical parts of right angularly bent rods 41. A pair of such rods 41 are mounted in any desired pair of holes in rod 35 and fixed thereto by set screws 42 and a similar pair of rods 41 are similarly fixed to rod 36. The horizontal parts of the rods 41 on rod 35 extend toward the similar parts of the rods 41 on rod 36 and such parts of all four rods 41 pass through vertical slots 42 in upstanding flanges 43 of the decorating member 15 and serve to support the same wtih freedom to rise to a limited extent relatively to rods 41, due to slots 42. Collars 44 on rods 41 serve to hold member 15 against displacement on rods 41.

It will be clear that the frame supporting the decorator is free to slide horizontally back and forth in a longitudinal direction on rods 34, and also that the decorator can be moved vertically up and down as the rods 34 are lifted by bellcrank 21. The decorator may likewise be horizontally moved back and forth in a transverse direction. This can be effected by pushing the rods 34 in a transverse direction which causes the links 33 to swing. The rods 29, to which the links are attached, are free to turn in blocks 27 to permit swinging of the links.

The three motions of the decorator 15, as just described, may be imparted by any suitable mechanism, as for example by three cams 46, 47 and 48, fixed to the drive shaft $s$ of wire belt $w$. The cam 46 imparts vertical movement to the decorator by means of a lever 49, pivoted at 50 to one of the frames E, and a link connection 51 to the lever 20 above described. The cam 47 imparts movement to the decorator in a horizontal plane and longitudinally with respect to the direction of travel of belt $w$. Cam 47 operates a lever 52, likewise pivoted to stud 50, and lever 52 is connected by a link 53 to a lever 54 fixed to the right hand shaft 18 (Fig. 1). Fixed to this shaft, at a point intermediate its ends is a bellcrank 55, the depending arm of which is forked to straddle rod 36. A spring 56 pulls on the short and substantially horizontal arm of bellcrank 55, tending to move the decorator supporting frame on its supporting rods 34 to the left (as viewed in Fig. 1), and tending to hold lever 52 engaged with its cam 47. The cam 48 operates a lever 57, pivoted on stud 50, and this lever is connected by a link 58 to a lever 59 fixed on a rock shaft 60. The shaft 60 is rotatably supported at its ends in bearings 60' provided on the vertical legs of the front frame 16. Fixed on shaft 60 is a depending lever 61 to the lower end of which is pivotally attached one end of a rod 62. Rod 62 extends transversely across the machine in overlying relation with the decorator supporting frame and its rear end is slidably supported in the rear wall 32. Fixed to and depending from rod 62 is an arm 63 (Fig. 3), which abuts one side of one longitudinal rod 37 of the decorator supporting frame. A spring 64 connects such rod 37 to shaft 60 and holds it against arm 63. Consequently, as lever 61 is rocked back and forth the aforesaid rod 37, as well as the entire decorator-supporting frame, will be moved and the cross rods 35 and 36 of said frame will pull on rods 34 which are pivotally supported by links 33 as above described.

Referring to Fig. 8, the cam 46 which effects the rising and falling movements of the plaque 15, has concentric dwell surfaces 65 and 66, either of which will maintain the plaque in the normal lifted position shown in Fig. 1. Between these two surfaces 65 and 66, there is a relatively steep surface 67 which allows the plaque 15 to quickly drop until it rests upon the confections $c$ beneath it, and a relatively sharp rise 68, which causes the plaque 15 to be lifted back to its normal level and draw out strings from the coatings of the confections engaged thereby. There is desirably some overtravel in the drop surface 67, allowing the plaque holding members 41 to descend further than necessary to secure contact with the confections. The plaque 15 will descend with members 41 until it rests by gravity on the tops of the confections $c$ and thereafter the members 41 can continue their downward movement to a certain extent without moving the plaque because of the vertical slots 42 in the side walls of the plaque. After the plaque 15 rises to draw out the strings, it is held stationary at the normal level by the dwell surface 66 while other operations are being performed. At the end of the dwell 66, the cam 46 has a gradual rise 69 to lift the plaque above its normal level and assist in breaking the strings of confection adhering thereto. After cam 46 has raised the plaque to this abnormal level it then lowers it again to the normal level by means of the drop surface 70.

Referring to Fig. 9, the cam 47 which moves the plaque 15 in a longitudinal direction, has a long dwell surface 71 which holds the plaque in the retracted position shown in Fig. 1. Between the extremities of surface 71 are surfaces 72, 73, 74 and 75 which cause the plaque successively to move forwardly (in the direction of travel of belt $w$), backwardly, forwardly and backwardly, respectively. The relative movements between the plaque and confections in a longitudinal direction are made up of the movements effected by cam 47 and the movements effected by the travel of belt $w$. During each revolution of cam 47 belt $w$, travelling continuously forward at uniform speed, moves a distance substantially equal to the length of plaque 15 (measured in the direction of travel of belt $w$). Accordingly, when cam 47 moves plaque 15 forwardly, the actual relative movement between the plaque and the confections is less than that imparted to the plaque by the cam because the confections are travelling in the same direction as that in which the plaque is moving. On the other hand, when cam 47 moves the plaque backwardly, the relative movement between the plaque and the confections is increased because of the forward movement of the confections by belt $w$. For example, the surface 72 actually moves plaque 15 forwardly a distance $u$ (Fig. 12) but the actual relative movement between the confections and plaque is the smaller distance $v$ in Fig. 11. Similarly, the surface 73 moves plaque 15 backwardly a distance $w$ (Fig. 12) but the relative movement between plaque and confections is the greater distance $x$ (Fig. 1). The surfaces 74 and 75 cause the movements $u'$ and $w'$ of Fig. 12.

The diagram of Fig. 12 shows the actual path of travel in a horizontal plane of any point on plaque 15 as effected by the combined actions of the cams 47 and 48. The diagram of Fig. 11, on the other hand, shows the relative movement between confections and plaque as effected by cams 47 and 48 and is drawn as if the belt $w$ and confections were stationary and as if the longitudinal movement produced by the belt were in fact effected entirely by movement of the plaque. That is, the diagram of Fig. 11 was formed by a composition of the longitudinal movement of the belt with the actual longitudinal movement of the plaque. The actual paths of the plaque, as shown in Fig. 12, have been appropriately modified to take into consideration the movement of the confections at uniform speed by belt $w$ and the resulting relative paths are shown in Fig. 11.

Referring to Fig. 10, the cam 48 which causes transverse movement of plaque 15 has a high point 76 which positions the plaque in its extreme position toward the back side of the machine as viewed in Fig. 1. From this point 76 leads a surface 77 which causes the plaque to move toward the front side of the machine, followed by a surface 78, which causes the plaque to move part way in its return travel toward the back side of the machine. A dwell surface 79 holds the plaque laterally stationary for an interval and this is followed by a rise 80 which completes the return movement of the plaque toward the back of the machine and brings it back into its original position. A peculiarity of cam 48 is that, although the surface 77 is about 55 degrees in angular extent, a much smaller angular movement of the cam, say 30 degrees, from high point 76 will cause the cam follower to reach the lowest point of the cam. The result is a very rapid lateral movement of the plaque 15 from one to the other of its two extreme positions in an interval only slightly longer than that necessary for cam 46 to cause the plaque to be lowered into contact with the confections. Such contact would probably occur after cam 46 has been moved about 25 degrees from the position shown in Fig. 8.

The combined action of cams 47 and 48 on the plaque 15 is shown in curve form in Fig. 12. The portion 77 of cam 48 causes the plaque to move crosswise of belt $w$ throughout its entire range, starting from its remote extremity. As above stated, this movement occurs during about 30 degrees angular movement of shaft $s$. During the same angular movement, the portion 72 of cam 47 moves the plaque forwardly. The result of both movements is shown by the line 81. The cam 48, by its portion 78, then starts to move the plaque crosswise of belt $w$ back to its original position. This return crosswise movement is relatively slow and requires about an eighty degree turning movement of shaft $s$, during which the portions 73 and 74 of cam 47 cause the plaque to move backwardly and forwardly respectively. The line 82 of Fig. 12 shows the combined rearward and return crosswise movement of the plaque as effected by cam portions 73 and 78 and the line 83 shows the combined forward and continued return crosswise movement as effected by portions 74 and 78. The cam portion 75 also acts in part during the action of portion 78, resulting in the curved line 84, representing rearward and return crosswise movement of the plaque. The latter part of the rearward movement of the plaque as effected by portion 75, is accomplished while the lever 57 is riding on the dwell portion 79 of cam 48 and hence the path of the plaque is the straight line 85. The next action is that lever 52 rides onto the dwell portion 71 of cam 47 and there ensues a relatively long interval during which the plaque is held against movement either longitudinally or laterally. Finally, the cam 48 by its portion 80 completes the return crosswise movement of the plaque while the same is held against movement in a longitudinal direction. The result of this is shown in Fig. 12 by the straight line 86. This line actually should coincide with the straight and initial part of line 81 but has been purposely offset therefrom for clearness of illustration.

As stated above, in order to get the relative movement between the plaque and confections, the movements shown in the diagram of Fig. 12 have to be modified by the continuous uniform motion imparted to the confections by belt $w$. The modified movements are indicated in Fig. 11 by the same reference numerals with the addition of a prime. The diagram of Fig. 11 is similar to the curve that would be obtained by a pencil carried by the plaque and bearing upon a paper fixed to the belt $w$.

With the diagram of Fig. 11, the operation should be clear. The only other action necessary to consider is that caused by cam 46. This cam, by its portion 67, simply lowers the plaque upon the confections,—contact being established say at about the point 87 in the path 81' in Fig. 11. Since as above explained, the cam 46 effects some overtravel in the movement of the plaque holding means, there results a short dwell of the plaque in lowered position. During this dwell period, the plaque is moved in a horizontal plane for the purpose of securing good adhesion between it and the fresh coating of the confections. As will be seen from Fig. 11, after the initiation of contact at 87, the plaque moves forwardly at a speed in excess of that of the confections. There is also some lateral movement at the same time. The plaque does not begin to lift until close to the end of the path marked 81'. Consequently, the plaque is rubbed into the fresh coating of the confections, and a firm adhesion to the plaque of a substantial portion of coating results. Considering the effect of this initial movement on the confection shown in Fig. 13, the first contact is probably made near the center of the confection, but the forward movement of the plaque relative to the confection displaces the coating toward the periphery in the direction of travel of the confection (indicated by the arrow). That is, the string of plastic coating is drawn up from the confection at the location 88 in Fig. 13 and it is also shifted crosswise to start the formation of the decoration s, due to the crosswise component of path 81'. At or near the end of this path 81', the plaque starts to rise and also to move through path 82'. This draws out the string of plastic coating due to the lifting of the plaque and the top end of the string is pulled rearwardly and laterally (in the so-called "return crosswise" direction), thereby still further drawing out the string. Then the plaque begins to move in path 83' and in continuing the lateral movement also moves forwardly at a speed greater than the confections. This last named path of movement turns the string forwardly. At or near the point 89 (Fig. 11) the string breaks away from the plaque and its free, and more or less attenuated end drops upon the top of the confection. The breaking of the string may be due entirely to drawing the same out to the breaking point in the process described, but I prefer to provide some means for assisting the action and causing it to occur with greater certainty at the desired predetermined point. The rise 69 on cam 46 is an example of one means for this purpose. The portion 69 causes the plaque to rise beyond its normal level and thereby increase the action of drawing out the string to the breaking point. It will be clear that the decoration is formed by the paths 82' and 83' and that such paths turn the string so that it will be laid on the top of the confection in the more or less circular form shown in Fig. 13. It should be noted that Fig. 13 is drawn substantially full size while Figs. 11 and 12 are drawn to one third the scale. The arrow in Fig. 3 indicates approximately the direction of travel of the confections.

In Fig. 11, there is shown simply the path of travel of one point on the plaque 15 and the decoration of one confection. Actually, the plaque simultaneously makes contact with a plurality of confections,—the number depending on the length and breadth of the plaque,—and a large number of confections are decorated at one time. As shown in Fig. 1, the plaque overlies three transverse rows of confections on belt w. These three rows, having been decorated by the one cycle of movement of the plaque above described, the plaque comes to rest until the belt w has moved far enough to bring the next three transverse rows of confections in under the plaque. This rest interval is represented by the lines 84', 85' and 86' in Fig. 11. Actually, the plaque moves crosswise (toward the back of the machine as viewed in Fig. 1) in the path 84'. This is for the purpose of preventing the drippings from the plaque from falling on the confections decorated or to be decorated. In the right hand part of Fig. 11, two confections $c^1$ and $c^2$ of one transverse row are shown. It will be seen that the paths 84', 85' and 86' are such that drippings from the plaque (at the points where the strings s were formerly attached) will fall on belt w at points between the longitudinal rows of confections. The confections $c^1$ and $c^2$ represent elements of two such rows.

It will be clear that variations in the decorations produced may be effected by changing the cam contours. The one set of cams described is merely illustrative of one of many that may be equally well used for the purpose.

The plaque 15 is not necessarily of sheet metal as shown, nor rigid, nor truly flat. Variations in the construction of the plaque may be made as desired. The essential thing is an approximately flat member, preferably also wide and long enough to cover at one time a large number of confections, although the method and apparatus could conceivably be used for decorating confections one at a time. The plaque may even have some flexibility, as if constructed for example of fabric as shown at 90 in Fig. 14. This member 90 would be fastened at its ends to a skeleton frame 15' (like the flanges 43 of plaque 15). This arrangement would allow the plaque to follow around the curvature of a confection to some extent and effect a larger area of contact therewith. The metal plaque shown may, if desired, be perforated as indicated in Fig. 2, to secure an increased hold on the plastic coating by reason of the coating passing through the perforations and becoming held to the plaque much like plaster is made to hold to lath. Many other variations will occur to those skilled in the art and I do not intend, by the use of the term "plaque", to limit myself to the one form herein shown.

I believe that I am the first to decorate confections by the method and apparatus herein disclosed and I desire to claim my invention in the broadest possible legal manner.

What I claim is:

1. In combination, a conveyer for carrying confections while their outer surfaces are plastic, a plaque-like decorating member overlying said conveyer and of sufficient area to overlie at one time a group of the confections on said conveyer, means for moving said member into contact with all the confections in said group and subsequently out of contact therewith sufficiently to draw out from each a string without breaking the same, and means for moving said member in a different direction while the strings remain attached thereto and in such a path relatively to the confections that the strings will be laid on their respective confections in decorative configurations.

2. In combination, a conveyer for carrying confections while their outer surfaces are plastic, a plaque-like decorating member overlying said conveyer and of sufficient area to overlie at one time a group of the confections thereon, means for moving said member into contact with all the confections in said group and subsequently out of contact therewith sufficiently to draw out from each a string without breaking the same, and means for moving said member in a different direction while the strings remain attached thereto and in such a path relatively to the confections that the strings will be laid on their respective confections in decorative configurations and for producing a further relative movement between said member and confection to cause the strings to break away from said member.

3. In combination, a continuously movable conveyer for carrying confections while their outer surfaces are plastic, a plaque-like decorating member overlying said conveyer and of sufficient area to overlie at one time a group of the confections thereon, means for moving said member into contact with all the confections in said group and subsequently out of contact therewith sufficiently to draw out from each a string without breaking the same, and means for moving said member in a different direction while the strings remain attached thereto and in such a path relatively to the confections that the strings will be laid on their respective confections in decorative configurations when the strings break away from said member due to continued movement of the confections by the conveyer.

4. In combination, a conveyer for carrying confections while their outer surfaces are plastic, a plaque-like decorating member overlying said conveyer and long enough and wide enough to overlie a plurality of transverse rows of confections on said conveyer, means for moving said member into contact with all the confections in said rows and subsequently out of contact therewith sufficiently to draw out from each a string without breaking the same, and means for moving said member in a different direction while the strings remain attached thereto and in such a path relatively to the confection that the strings will be laid on their respective confections in decorative configurations.

5. In combination, a conveyer for carrying confections while their outer surfaces are plastic, a plaque-like decorating member overlying said conveyer and long enough and wide enough to overlie a plurality of transverse rows of confections on said conveyer, means for moving said member into contact with all the confections in said rows and subsequently out of contact therewith sufficiently to draw out from each a string without breaking the same, and means for moving said member in a different direction while the strings remain attached thereto and in such a path relatively to the confection that the strings will be laid on their respective confections in decorative configurations, and for producing a further relative movement between said member and confection to cause the strings to break away from said member.

6. In combination, a conveyer of freshly coated confections, a flexible plaque-like decorating member overlying said conveyer and extending across substantially the entire width thereof, means for lowering said member to simultaneously engage all the underlying confections on said conveyer and for subsequently raising the same to draw out decorative strings from the plastic coatings of the confections.

7. In combination, a support for a freshly coated confection, an overlying decorating member, means to move said member toward the support and into contact with the plastic coating of the confection and subsequently to raise the member far enough to draw out a string of coating from the confection, and means for producing a relative movement between the member and support in a plane substantially parallel therewith while said string remains attached to said member.

8. In combination, a support for a freshly coated confection, an overlying decorating member, means to move said member toward the support and into contact with the plastic coating of the confection and subsequently to raise the member far enough the draw out a string of coating from the confection, means for producing a relative movement between the support and member in a plane substantially therewith and while the member is in contact with the confection, and means for producing a relative movement between the member and support in a plane substantially parallel therewith while said string remains attached to said member.

9. In combination, a support for a freshly coated confection, an overlying decorating member, means to move said member toward the support and into contact with the plastic coating of the confection and subsequently to raise the member far enough to draw out a string of coating from the confection, means for producing a relative movement between the member and support in a plane substantially parallel therewith while said string remains attached to said member, and means operable after said last named movement to raise said member to a higher level to assist in the breaking away of the string therefrom.

10. In combination, a continuously movable conveyer for carrying confections while their outer surfaces are plastic, a plaque-like decorating member overlying said conveyer and wide enough to overlie at one time a plurality of transversely spaced confections, means for moving said member into contact with said plurality of confections and subsequently out of contact therewith sufficiently to draw out from each a string without breaking the same, means for moving said member in a different direction while the strings remain attached thereto and in such a path relatively to the confections that the strings will be laid on their respective confections in decorative configurations when the strings break away from said member due to continued movement of the confections by the conveyer, and means for shifting said member transversely of the conveyer after the formation of said configurations into a position such that drippings from said member will fall in the spaces between the confections.

11. Apparatus for decorating confections while their outer surfaces are plastic and workable, comprising, a decorating member, means for moving said member into contact with the plastic surface of the confection to effect adhesion of a portion of the plastic surface to said member and for moving said member away from the confection after such adhesion has been established and to an extent sufficient to draw out a portion of the plastice surface into a string, means operable while such string remains attached to both the confection and member for producing a relative movement therebetween in a plane substantially at right angles to the first named path of movement of said member to cause the string to be moved relatively to the confection and means subsequently operable to produce a further relative movement between said member and confection to break the string and allow it to fall back on the confection in an ornamental form.

12. Apparatus for decorating confections while their outer surfaces are plastic and workable, comprising, a decorating member, means for moving said member into contact with the plastic surface of the confection, means operable after contact of said member with the confection has been established to move the member in a direction at right angles to that of the first named movement to rub the member into the plastic surface and effect adhesion of a portion of the plastic surface to said member, said first named means operable after the member has been rubbed into the plastic surface to move said member away from the confection to an extent sufficient to draw out a portion of the plastic surface into a string, means operable while such string remains attached to both the confection and member for producing a relative movement therebetween in a plane substantially at right angles to the first named path of movement of said member to cause the string to be moved relatively to the confection and means subsequently operable to produce a further relative movement between said member and confection to break the string and allow it to fall back on the confection in an ornamental form.

13. Apparatus for decorating confections while their outer surfaces are plastic and workable, comprising, a conveyer for carrying confections while their outer surfaces are plastic and workable, a member overlying said conveyer and of sufficient area to overlie at one time a group of the confections thereon, said member having a substantially flat confection engaging face disposed in a plane substantially parallel with that of the confection-carrying stretch of said conveyer, means for moving said member to bring said face simultaneously into contact with a group of confections on said conveyer and subsequently out of contact therewith to draw out from each a string without breaking the same, and means for moving said member in a different direction while the strings remain attached thereto and in such a path relatively to the confections that the strings will be laid on their respective confections in decorative configurations.

14. Apparatus for decorating confections while their outer surfaces are plastic and workable, comprising, a decorating member, means for moving said member toward and yieldingly depositing it on the plastic surface of the confection so that it rests thereon solely by its weight, said means operable after adhesion of said member to said surface has been established to move said member away from the confection far enough to draw out a portion of the plastic surface into a string, means operable while such string remains attached to both the confection and member for producing a relative movement therebetween in a plane substantially at right angles to the first named path of movement of said member to cause the string to be moved relatively to the confection and means subsequently operable to produce a further relative movement between said member and confection to break the string and allow it to fall back on the confection in an ornamental form.

15. Apparatus for decorating confections while their outer surfaces are plastic, comprising, a decorating member, means for lowering said member into contact with the plastic upper surface of a confection and subsequently raising it to draw a portion of said surface upwardly in string like form, and means operable after the raising of said member for moving the same relatively to the confection in a substantially horizontal plane while said string like portion remains attached to the member, whereby such portion when it breaks away from the member will fall back upon the confection in decorative form.

16. Apparatus for decorating confections while their outer surfaces are plastic and workable, comprising, a conveyer for carrying confections while their outer surfaces are plastic and workable, a flexible member overlying said conveyer and of sufficient area to overlie at one time a group of the confections thereon, said member having a substantially flat confection engaging face disposed in a plane substantially parallel with that of the confection-carrying stretch of said conveyer, means for moving said member to bring said face simultaneously into contact with a group of confections on said conveyer and subsequently out of contact therewith to draw out from each a string without breaking the same, and means for moving said member in a different direction while the strings remain attached thereto and in such a path relatively to the confections that the strings will be laid on their respective confections in decorative configurations.

ALONZO LINTON BAUSMAN.